United States Patent [19]
Yumoto et al.

[11] Patent Number: 5,031,473
[45] Date of Patent: Jul. 16, 1991

[54] AUTOMOTIVE TRANSMISSION

[75] Inventors: Toshiyuki Yumoto; Hiroshi Nakayama; Hiroyuki Shimada, all of Saitama, Japan

[73] Assignee: Honda Giken Kogyo Kabushiki Kaisha, Tokyo, Japan

[21] Appl. No.: 318,630

[22] Filed: Mar. 2, 1989

[30] Foreign Application Priority Data

Mar. 2, 1988 [JP] Japan .................. 63-049435

[51] Int. Cl.$^5$ .................................. F16H 3/08
[52] U.S. Cl. ............................ 74/359; 74/331
[58] Field of Search ............ 74/331, 700, 359

[56] References Cited

U.S. PATENT DOCUMENTS

| | | | |
|---|---|---|---|
| 2,531,818 | 11/1950 | Kranick | 74/700 |
| 2,602,346 | 7/1952 | Eaton et al. | 74/700 X |
| 2,796,942 | 6/1957 | Hill | 74/700 X |
| 2,851,115 | 9/1958 | Buckendale | 74/700 X |
| 4,033,200 | 7/1977 | Stockton | 74/359 |
| 4,319,499 | 3/1982 | Sanui et al. | 74/700 |
| 4,464,947 | 8/1984 | Windsor-Smith et al. | 74/331 X |
| 4,662,242 | 5/1987 | Atkinson et al. | 74/359 X |
| 4,708,026 | 11/1987 | Ikemoto | 74/331 X |
| 4,718,295 | 1/1988 | Jesena | 74/359 X |
| 4,738,150 | 4/1988 | Miner | 74/359 |
| 4,799,395 | 1/1989 | Janiszewski | 74/331 |
| 4,799,399 | 1/1989 | Bruce | 74/359 X |
| 4,802,373 | 2/1989 | Saint-Jean et al. | 74/359 |

FOREIGN PATENT DOCUMENTS

| | | |
|---|---|---|
| 1213261 | 3/1966 | Fed. Rep. of Germany . |
| 2164001 | 2/1973 | France . |
| 2210252 | 5/1974 | France . |
| 2358288 | 10/1978 | France . |
| 58-99544 | 6/1983 | Japan . |

Primary Examiner—Dirk Wright
Attorney, Agent, or Firm—Lyon & Lyon

[57] ABSTRACT

An automotive transmission has a plurality of transmission gear trains and clutching means (such as synchromesh mechanisms, hydraulic clutches, or the like) which are disposed between first and second shafts for selecting gear positions, and includes a first gear fixed to an input shaft, a second gear disposed on the second shaft and meshing with the first gear, a third gear rotatably mounted on a third shaft and rotatable with the second gear, and clutching means for connecting or disconnecting the third gear and the third shaft. The axial dimension of the transmission of the invention is rendered shorter than the axial dimension of the conventional transmission.

3 Claims, 5 Drawing Sheets

AUTOMOTIVE TRANSMISSION

BACKGROUND OF THE INVENTION

The present invention relates to an automotive transmission, and more particularly to a transmission of the countershaft type.

There are many automotive transmission of the countershaft type having first through third parallel shafts, a plurality of trains of intermeshing transmission gears, and clutching means (engaging/disengaging means) such as hydraulic clutches, synchromesh mechanisms, or the like for selecting power transmission via any one of the transmission gear trains, the gears and the clutching means being disposed parallel to each other in the axial direction. Engine output power which has been changed in speed by the transmission gear train selected by the clutching means is transmitted to the third shaft (see Japanese Patent Publication No. 62-34979, for example).

The transmission gears in such countershaft-type transmissions are arranged in various designs dependent on whether the engine is directed longitudinally or transversely with respect to the automobile.

An automatic transmission of the countershaft type for use with an engine directed transversely in an engine compartment is shown in FIG. 6 of the accompanying drawings. The transmission, generally designated by the reference numeral 70, has an input shaft 72 disposed on a first shaft coaxially with and engageable with and disengageable from an output shaft (flywheel) 2a of an engine 2 through a main clutch 71, and a countershaft 73 and an output shaft 74 disposed respectively on second and third shafts lying parallel to the first shaft. The transmission 70 also includes five trains of intermeshing transmission gears 81a, 81b; 82a, 82b; 83a, 83b; 84a, 84b; 85a, 85b and synchromesh mechanisms 76 through 78, all disposed between the input shaft (first shaft) 72 and the countershaft (second shaft) 73 and parallel to each other in the axial direction. Any one of the synchromesh mechanisms 76 through 78 is operated to select one of the transmission gear trains for power transmission and speed changing. The engine output power thus changed in speed is transmitted through output gears 89a, 89b to the output shaft (third shaft) 74, from which drive power is transmitted to lefthand and righthand road wheels.

FIG. 7 shows an automatic transmission of the countershaft type for use with an engine directed longitudinally in an engine compartment. The transmission, generally designated by the reference numberal 90, has an input shaft 92a disposed on a first shaft coaxially with and engageable with and disengageable from an output shaft (flywheel) 2a of an engine 2 through a main clutch 91, and a second countershaft 92b disposed on the first shaft and engageable with and disengageable from the input shaft 92a. The transmission 90 also has a first countershaft 93 and an output shaft 94 disposed respectively on second and third shafts lying parallel to the first shaft. The transmission 90 also includes a train of intermeshing input gears 101a, 101b disposed between the input shaft 92a and the first countershaft 93, five trains of intermeshing transmission gears 102a, 102b; 103a, 103b; 104a, 104b; 105a, 105b; 106a, 106b and synchromesh mechanisms 96 through 98, all disposed between the second countershaft (first shaft) 92b and the first countershaft (second shaft) 93 and parallel to each other in the axial direction. Any one of the synchromesh mechanisms 96 through 98 is operated to select one of the transmission gear trains for power transmission and speed changing. The engine output power thus changed in speed is transmitted through output gears 109a, 109b, 109c to the output shaft (third shaft) 94, from which drive power is transmitted to front and rear road wheels.

The transmissions described above have large axial dimensions since the plurality of the trains of transmission gears and the synchromesh mechanisms (hydraulic clutches may be employed in place of the synchromesh mechanisms) for selecting one of the gear trains are disposed between the first and second shafts and lie parallel to each other in the axial direction. The more the gear positions of the transmission, the greater the axial dimension thereof.

With the transmission being directed transversely in the engine compartment, if the axial dimension of the transmission is large, any margin of the installation space available in the engine compartment for the transmission is small. Where the transmission is directed longitudinally in the engine compartment, if the axial dimension of the transmission is large, it suffers from the problem of a reduced passenger compartment space in addition to the above problem of the reduced margin of the installation space in the engine compartment. Another drawback is that the shafts of the transmissions are longer and have reduced rigidity, increasing noise from the gears on the shafts and reducing gear durability. Furthermore, the rigidity of the transmission case is lowered and hence vibration and noise of the power line are increased.

SUMMARY OF THE INVENTION

It is an object of the present invention to provide a transmission which can solve the above problems by reducing the axial dimension thereof.

To achieve the above object, there is provided an automotive transmission according to the present invention having first, second, and third shafts parallel to each other, at least a portion of the first shaft comprising an input shaft connected to the output shaft of an engine, a plurality of trains of intermeshing transmission gears for selecting gear positions and clutching means for selecting any one of the plurality of trains of intermeshing transmission gears to change the speed of rotation of output power from the engine, the transmission gears and clutching means being disposed between the first and second shafts and juxtaposed in an axial direction, the arrangement being such that the output power from the engine which has been changed in speed by the train of transmission gears selected by the clutching means is transmitted to the third shaft, characterized by:

a first gear fixed to the input shaft, a second gear disposed on the second shaft and held in mesh with the first gear, a third gear disposed on the third shaft and rotatable with the second gear, and clutching means for connecting or disconnecting the third gear with the third shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein.

DESCRIPTION OF THE PREFERRED EMBODIMENTS

Figure 1:
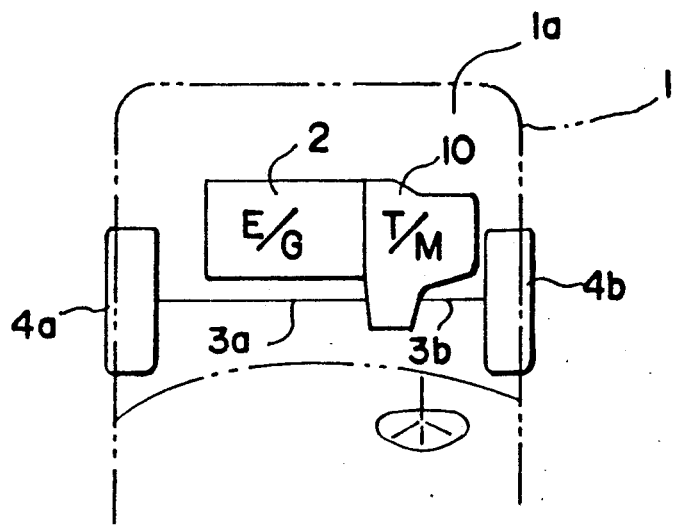
FIGS. 1 and 4 are schematic plan views of power lines of automobiles on which transmissions according to the present invention are mounted.

FIG. 1 is a schematic plan view showing a power line in an automobile 1 which is an FF automobile that drives frond road wheels 4a, 4b in the illustrated embodiment. The automobile 1 has an engine 2 with the crankshaft extending transversely of the automobile body, and a transmission 10 coupled to a side end of the engine 2. Output power from the transmission 10 is transmitted to the front wheels 4a, 4b via lateral axle shafts 3a, 3b coupled to the front wheels 4a, 4b. As can be seen from FIG. 1, it is desirable to reduce the dimensions of the engine 2 and the transmission 10 in the transverse direction of the automobile body of easy installation of the engine 2 and the transmission 10 into the engine compartment in the front portion of the automobile body.

Figure 2:
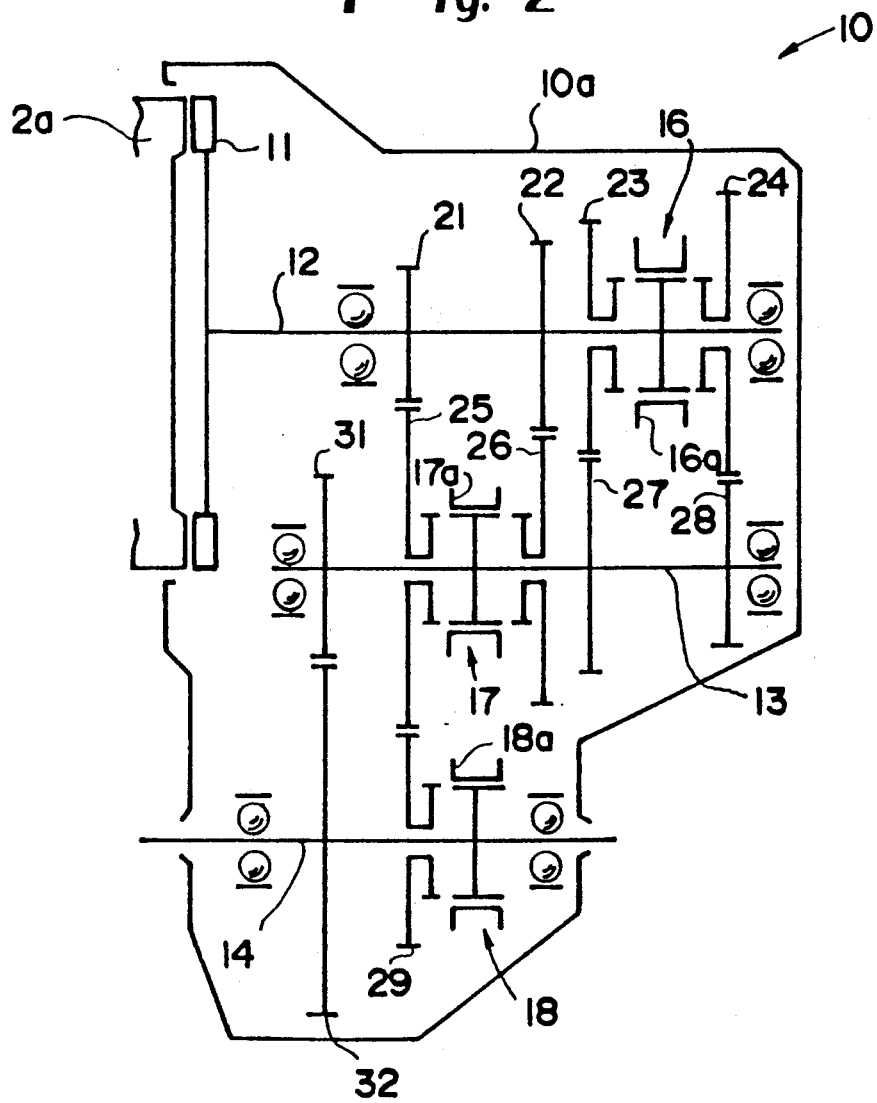
FIGS. 2, 3, and 5 are cross-sectional views showing the transmission of the invention.

FIG. 2 shows a power transmitting structure in the transmission 10. The transmission 10 includes a case 10a joined to the engine 2 and has a transmission input shaft (first shaft) 12 coupled via a main clutch 11 to a flywheel 2a serving as an output shaft of the engine 2. The transmission 10 further has a countershaft (second shaft) 13 and an output shaft (third shaft) 14 which extend parallel to the input shaft 12.

On the input shaft or first shaft 12, there are mounted four drive gears 21, 22, 23, 24 and a first synchromesh mechanism 16 which are juxtaposed in the axial direction. The first and second drive gears 21, 22 are fixedly connected to the input shaft 12. The third and fourth drive gears 23, 24 are rotatably mounted on the input shaft 12, and can selectively be coupled to and separated from the input shaft 12 by the first synchromesh mechanism 16 disposed between the gears 23, 24. On the countershaft or second shaft 13, there are mounted an output drive gear 31, first through fourth driven gears 25, 26, 27, 28 held in mesh with the drive gears 21, 22, 23, 24 respectively, and a second synchromesh mechanism 17, these gears and synchromesh mechanism being juxtaposed in the axial direction. The output drive gear 31, and the third and fourth drive gears 27, 28 are fixedly connected to the countershaft 13. The first and second driven gears 25, 26 are rotatably mounted on the countershaft 13, and can selectively be coupled to and separated from the countershaft 13 by the second synchromesh mechanism 17 disposed between gears 25, 26.

Therefore, between the first and second shafts, there are axially juxtaposed four sets of transmission drive and driven gears 21, 22, 23, 24, 25, 26, 27, 28, and the first and second synchromesh mechanisms (clutching means) 16, 17 for selecting one of these gear sets.

The countershaft or third shaft 14 supports thereon an output driven gear 32 meshing with the output drive gear 31, and a fifth driven gear 29 meshing with the first driven gear 25. The output driven gear 32 is fixedly mounted on the output shaft 14, whereas the fifth driven gear 29 is rotatably mounted on the output shaft 14 and can selectively be connected to and disconnected from the output shaft 14 by a third synchromesh mechanism 18. The output shaft 14 is coupled at its opposite ends to the axle shafts 3a, 3b.

A power transmission path in the transmission 10 thus constructed will be described below.

The transmission of output power from the engine 2 to the transmission 10 is controlled by engaging and disengaging the main clutch 11. When the main clutch 11 is engaged, the output power from the engine 2 is transmitted to the transmission input shaft 12. Dependent on the operation of a shift lever positioned at the driver's seat, the first through third synchromesh mechanisms (engaging/disengaging means) 16, 17, 18 are selectively operated to determine a power transmission path.

More specifically, where any of the synchromesh mechanisms is in a neutral position (as shown in FIG. 2), the input shaft 12, the gears 21, 22 fixed to the input shaft 12, and the gears 25, 26, 29 meshing with gears 21, 22 are rotated. However, no engine output power is transmitted to the output shaft 14, and the transmission is kept in a neutral position.

When a sleeve 16a of the first synchromesh mechanism 16 is moved to the right by the shift lever, the fourth drive gear 24 is brought into engagement with the input shaft 12 to transmit the rotation of the input shaft 12 to the countershaft 13 while the speed of rotation is being changed by the fourth drive and driven gears 24, 28. Then, the rotation is transmitted via the output drive and driven gears 31, 32 to the output shaft 14. When the sleeve 16a is moved to the left, the third drive gear 23 is brought into engagement with the input shaft 12 to transmit the rotation of the input shaft 12 to the countershaft 13 while the speed of rotation is being changed by the third drive and driven gears 23, 27. Then, the rotation is transmitted via the output drive and driven gears 31, 32 to the output shaft 14.

When the first synchromesh mechanism 16 is moved back to the neutral position, and a sleeve 17a of the second synchromesh mechanism 17 is moved to the right, the second driven gear 26 is brought into engagement with the countershaft 13 to transmit the rotation of the input shaft 12 to the countershaft 13 while the speed of rotation is being changed by the second drive and driven gears 22, 26. Then, the rotation is transmitted via the output drive and driven gears 31, 32 to the output shaft 14. When the sleeve 17a is moved to the left, the first driven gear 25 is brought into engagement with the countershaft 13 to transmit the rotation of the input shaft 12 to the countershaft 13 while the speed of rotation is being changed by the first drive and driven gears 21, 25. Then, the rotation is transmitted via the output drive and driven gears 31, 32 to the output shaft 14.

When the second synchromesh mechanism 17 is moved back to its neutral position, and a sleeve 18a of the third synchromesh mechanism 18 is moved to the left, the fifth drive gear 29 is brought into engagement with the output shaft 14 to transmit the rotation of the input shaft 12 to the output shaft 14 through the first drive gear 21 fixed to the input shaft 12, the first driven gear 25 rotatable on the countershaft 13, and the fifth driven gear 29.

As described above, the transmission 10 can select any one of the first through fifth gear positions by moving the shift lever to operate the first through third synchromesh mechanisms 16 through 18.

Figure 6:
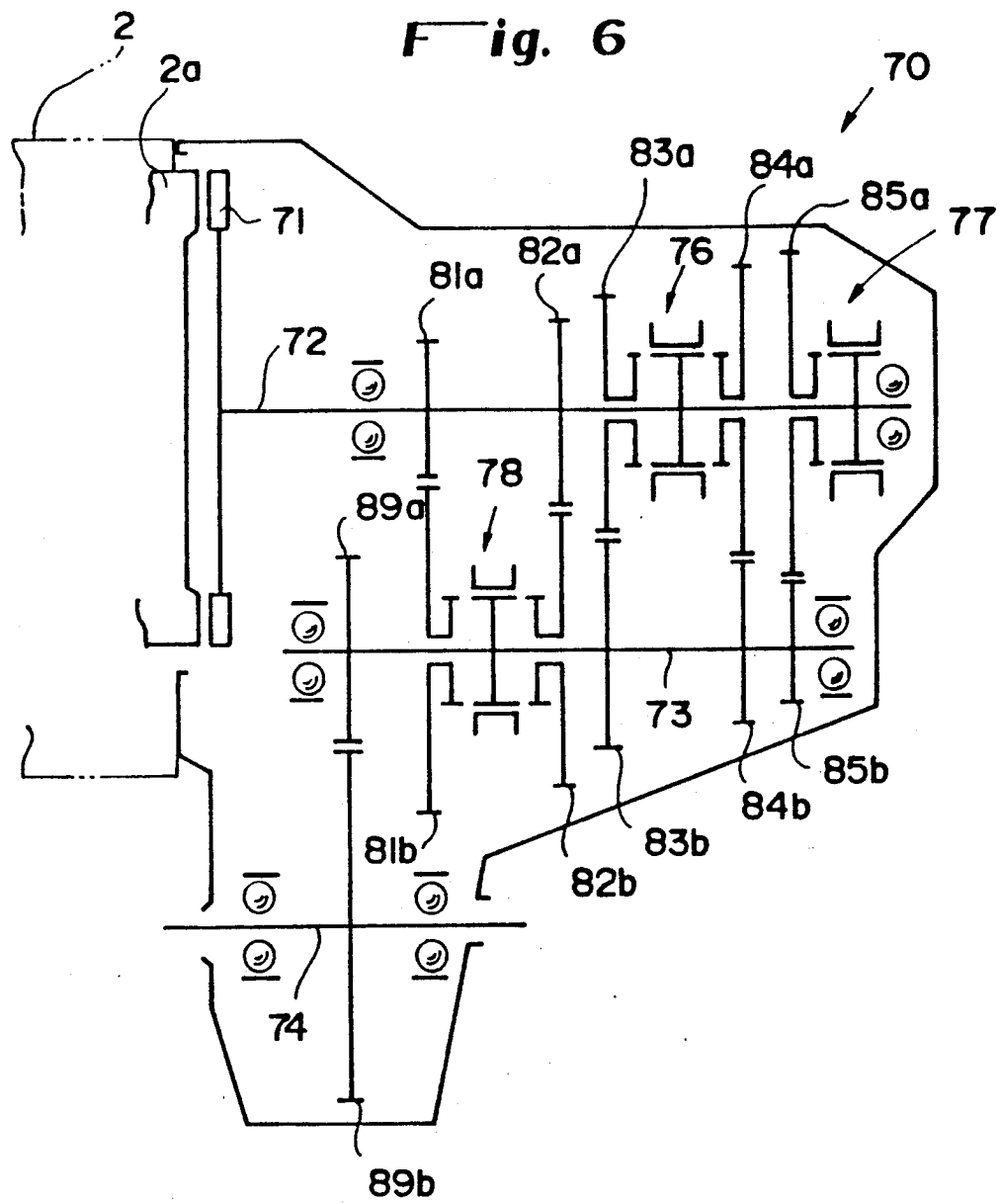
FIGS. 6 and 7 are cross-sectional views showing conventional transmission.

In the transmission of the above construction, the first through fourth drive gears 21 through 24, and the first through fourth driven gears 25 through 28 meshing respectively therewith are juxtaposed in the axial direction. The fifth driven gear 29 which can selectively be brought into and out of engagement with the output shaft 14 by the third synchromesh mechanism 18 is aligned with the first drive and driven gears 21, 25 and held in mesh with the first driven gear 25. Therefore, the axial dimension of the transmission 10 is shorter than that of the conventional transmission shown in FIG. 6 by the widths of the fifth driven gear 29 and the third synchromesh mechanism 18.

With the transmission being thus reduced in its axial dimension, as is apparent from FIG. 1, an installation space for placing the engine and the transmission transversely of the automobile body has a large margin, allowing the engine and the transmission to be installed with ease. The shafts 12, 13, 14 in the transmission 10 are rendered short, and so are their axial spans supported by bearings, resulting in higher shaft rigidity. Accordingly, the gears supported on these shafts are held in neat and smooth mesh, produce less noise, and have increased durability. The transmission case 10a of the transmission 10 is also reduced in size, increased in rigidity, and reduces vibration and noise of the transmission and the power line coupled thereto.

Figure 3:
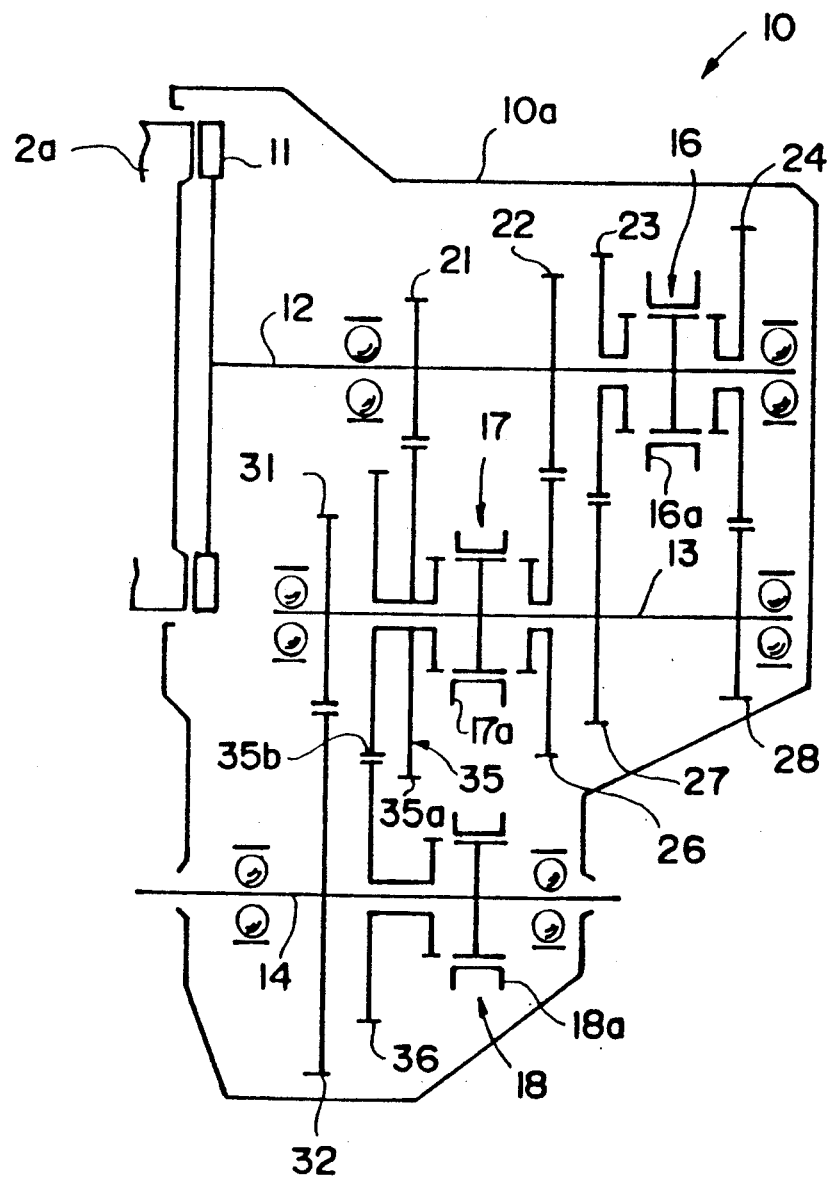

FIG. 3 shows a transmission according to a different embodiment of the present invention. The transmission of this embodiment differs from the transmission of FIG. 2 only in that the first driven gear 35 is composed of a gear 35a meshing with the first drive gear 21 and a gear 35b meshing with the fifth driven gear 36. The other details of the transmission shown in FIG. 3 are the same as those of the transmission of FIG. 2 with the arrangement of FIG. 3, the gear ratio between the first drive gear 21 and the gear 35a and the gear ratio between the gear 35b and the fifth driven gear 36 can be selected independently of each other with greater freedom.

Figure 4:
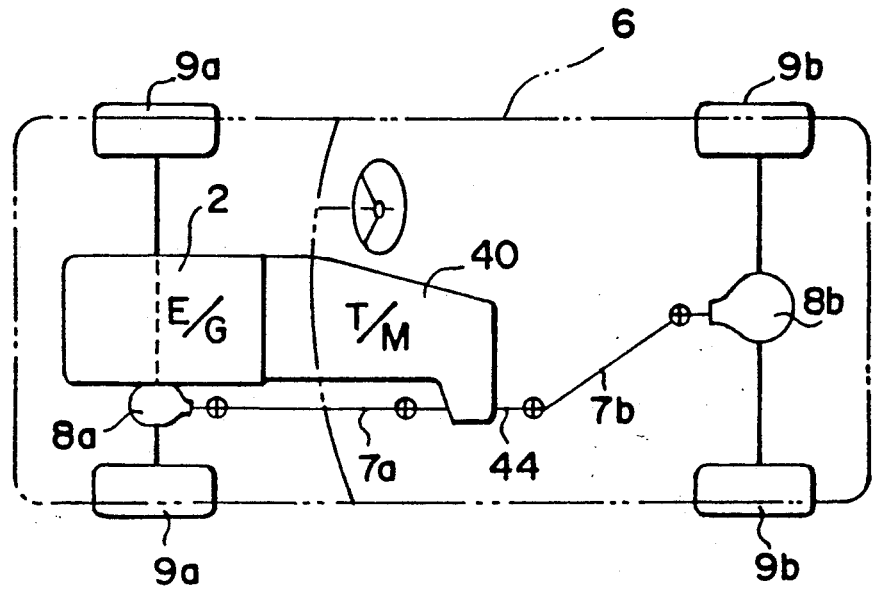

A transmission directed longitudinally of an automobile body will be described below. FIG. 4 is schematic plan view showing a power line in a 4WD automobile which has an engine 2 disposed in an automobile body 6 with the crankshaft extending longitudinally of the automobile body 6. A transmission 40 is connected to the rear end of the engine 2. Driver power from the engine 2 is transmitted from drive shafts 7a, 7b extending forwardly and rearwardly from an output shaft 44 of the transmission 40 to pairs of front and rear road wheels 9a, 9b via differentials 8a, 8b, respectively. Since a rear portion of the transmission 40 projects into the passenger compartment of the automobile to reduce the space of the passenger compartment, it is desirable that the longitudinal dimension (axial dimension) of the transmission 40 be shortened to reduce the extent to which the rear end of the transmission 40 projects into the passenger compartment.

Figure 5:
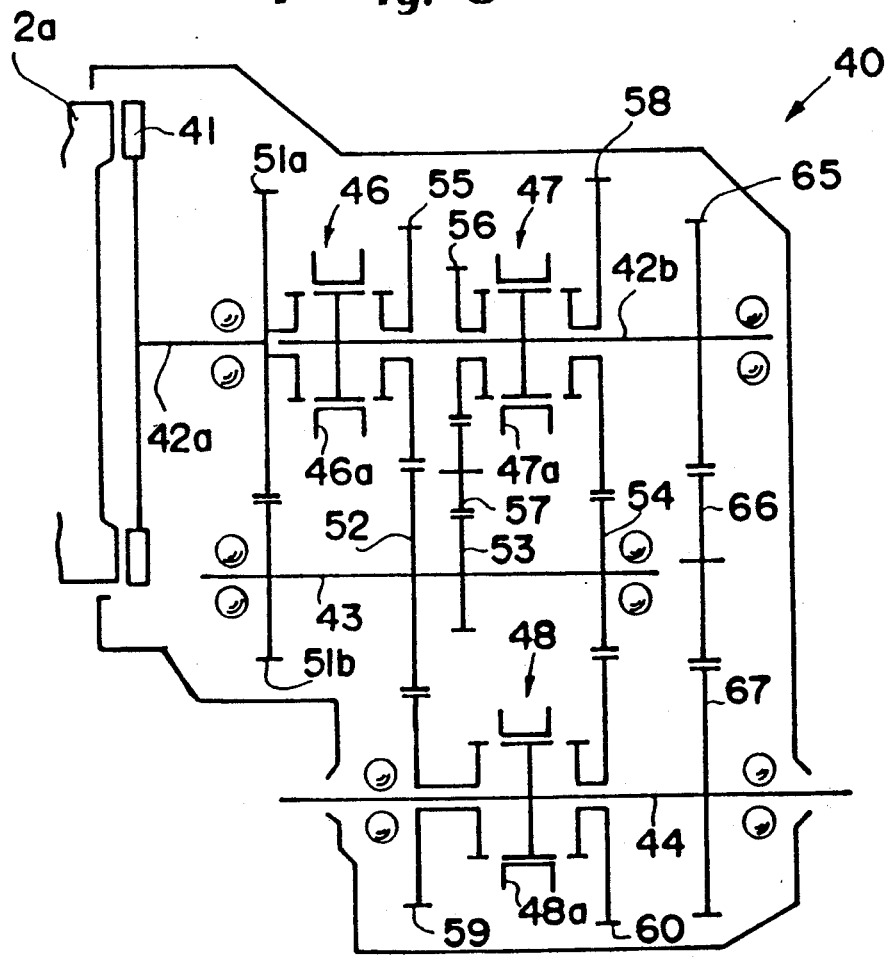

FIG. 5 schematically shows the structure of a power transmitting system in the transmission 40. The transmission 40 has an input shaft 42a disposed on a first shaft coaxially with and engageable with and disengageable from an output shaft 2a of an engine 2 through a main clutch 41, and a second countershaft 42b disposed on the first shaft and engageable with and disengageable from the input shaft 42a by first synchromesh mechanism 46. The transmission 40 also has first countershaft 43 and an output shaft 44 disposed respectively on second and third shafts lying parallel to the first shaft.

The input shaft 42a consisting part of the first shaft and the first countershaft 43 consisting the second shaft are coupled to each other by input drive and driven gears 51a, 51b. Engine output power supplied via the main clutch 41 is transmitted from the input shaft 42a to the first countershaft 43.

The transmission 40 also includes first through third drive gears 52, 53, 54 fixedly mounted on the first countershaft 43, and first through third driven gears 55, 56, 58 rotatably mounted on the second countershaft 42a consisting part of the first shaft and held in mesh with the gears 52, 53, 54, respectively. The second drive gear 53 is held in mesh with the second driven gear 56 through reverse idler gear 57. First and second synchromesh mechanisms 46, 47 are disposed on the second countershaft 42b respectively between the input drive gear 51a and the first drive gear 55 and between the second driven gear 56 and the third driven gear 58. The input shaft 42a and the second countershaft 42b can selectively be brought into and out of engagement with each other, and the first through third driven gears 55, 56, 58 can selectively be brought into and out of engagement with the second countershaft 42b, by operating the synchromesh mechanisms 46, 47.

Therefore, between the first and second shafts, there are axially juxtaposed a set of input drive and driven gears 51a, 51b, three sets of transmission drive and driven gears 52, 53, 54, 55, 56, 58, and the first and second synchromesh mechanisms 46, 47.

The output or third shaft 44 supports thereon an output driven gear 67 fixed thereto and meshing with the output drive gear 65 fixed to the second countershaft 42b through an idler gear 66, and fourth and fifth driven gears 59, 60 rotatably mounted on the output shaft 44 and meshing with the first and third drive gears 52, 54 which are fixed to the first countershaft 43. A third synchromesh mechanism 48 is disposed on the output shaft 44 between the fourth and fifth driven gears 59, 60. The fourth and fifth driven gears 59, 60 can selectively be brought into and out of engagement with the output shaft 44 by the third synchromesh mechanism 48. The output shaft 44 is coupled at its opposite ends to the front and rear drive shafts 7a, 7b.

A power transmission path in the transmission 40 thus constructed will be described below.

When the main clutch 41 is engaged, the output power from the engine 2 is transmitted to the input shaft 42a, and via the input drive and driven gears 51a, 51b to the first countershaft 43. Dependent on the operation of a shift lever positioned at the driver's seat, the first through third synchromesh mechanisms (engaging-/disengaging means) 46, 47, 48 are selectively operated to determine a power transmission path.

More specifically, when any of the synchromesh mechanisms are in a neutral position (as shown in FIG. 5), the input shaft 42a, the input drive and driven gears 51a, 51b, the first countershaft 43, the first through third drive gears 52, 53, 54 fixed to the first countershaft 43, and the first through fifth driven gears 55, 56, 58, 59, 60 meshing these gears are rotated with the engine. However, the second countershaft 42b and the output shaft 44 are not rotated, and the transmission 40 is kept in a neutral position.

Any one of sleeves 46a through 48a of the synchromesh mechanisms 46 through 48 is then moved to the left or the right from the neutral position to effect a speed change. When the sleeve 46a of the first synchromesh mechanism 46 is moved to the left, the input shaft 42a and the second countershaft 42b are directly coupled to each other, and when the sleeve 46a is moved to the right, the first driven gear 55 engages the second countershaft 42b. Upon leftward or rightward movement of the sleeve 47a of the second synchromesh mechanism 47, the second or third driven gear 56 or 58 engages the second countershaft 42b, so that the engine output power transmitted to the input shaft 42a is transmitted to the second countershaft 42b while being changed in speed through a transmission path selected by the first or second synchromesh mechanism 46 or 47. Thereafter, the output power is transmitted via the output gears 65, 66, 67 to the output shaft 44.

When the sleeve 48a of the third synchromesh mechanism 48 is moved to the left or the right, the fourth or fifth driven gear 59 or 60 engages the output shaft 44. Therefore, the engine output power transmitted to the input shaft 42 is transmitted to the output shaft 44 through the input gears 51a, 51b, the first countershaft 43 and the gears 52, 59 or 54, 60.

Figure 7:
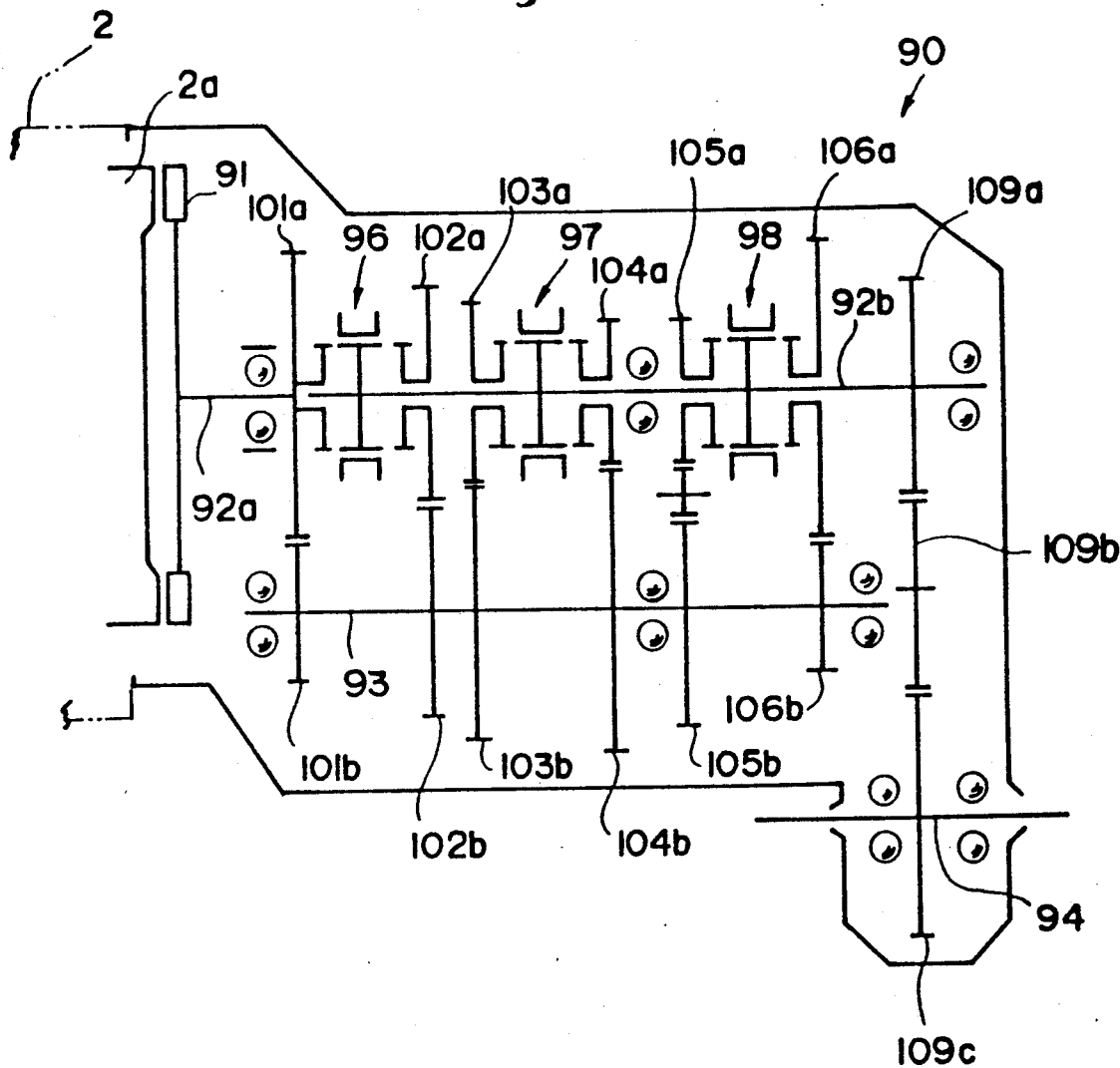

With the transmission of FIG. 5, since the third synchromesh mechanism 48 and the fourth and fifth driven gears 59, 60 for selecting a gear position in response to operation of the synchromesh mechanism 48 are disposed on the output shaft (third shaft) 44, axial dimension of the transmission 40 is shorter than that of the conventional transmission shown in FIG. 7 by the widths of the fourth and fifth driven gears 59, 60 and the third synchromesh mechanism 48.

While the present invention has been described above with reference to manual transmission, the principles of the invention are also applicable to an automatic transmission which has a torque converter positioned in place of the main clutch and hydraulic clutches disposed in place of the synchromesh mechanisms.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automotive transmission having first, second, and third shafts parallel to each other, at least a portion of said first shaft comprising an input shaft connected to an output shaft of an engine, first, second, third and fourth speed range gear trains of intermeshing transmission gears for selecting gear positions and first, second, third and fourth clutching means to selectively operate the first, second, third and fourth speed range gear trains of intermeshing transmission gears to change a speed of rotation of output power from the engine, said transmission gears and clutching means being axially juxtaposed between said first and second shafts, the arrangement being such that output power from the engine is transmitted to said third shaft through the train of transmission gears selected by one of said clutching means, characterized by:

a first drive gear fixed to said input shaft, a first driven gear disposed on said second shaft and held in mesh with said first drive gear, a fifth driven gear disposed on said third shaft and rotatable with said first driven gear, and a fifth clutching means disposed on said third shaft for connecting or disconnecting said fifth driven gear with said third shaft.

2. An automobile transmission as defined in claim 1, wherein said engine is directed transversely in an automobile and said transmission is coupled to a side end of said engine.

3. An automobile transmission as defined in claim 1, wherein said engine is directed longitudinally in an automobile and said transmission is coupled to a rear end of said engine.

* * * * *